RF SPUTTERING OF TETRAGONAL GERMANIUM DIOXIDE
Filed Oct. 26, 1970
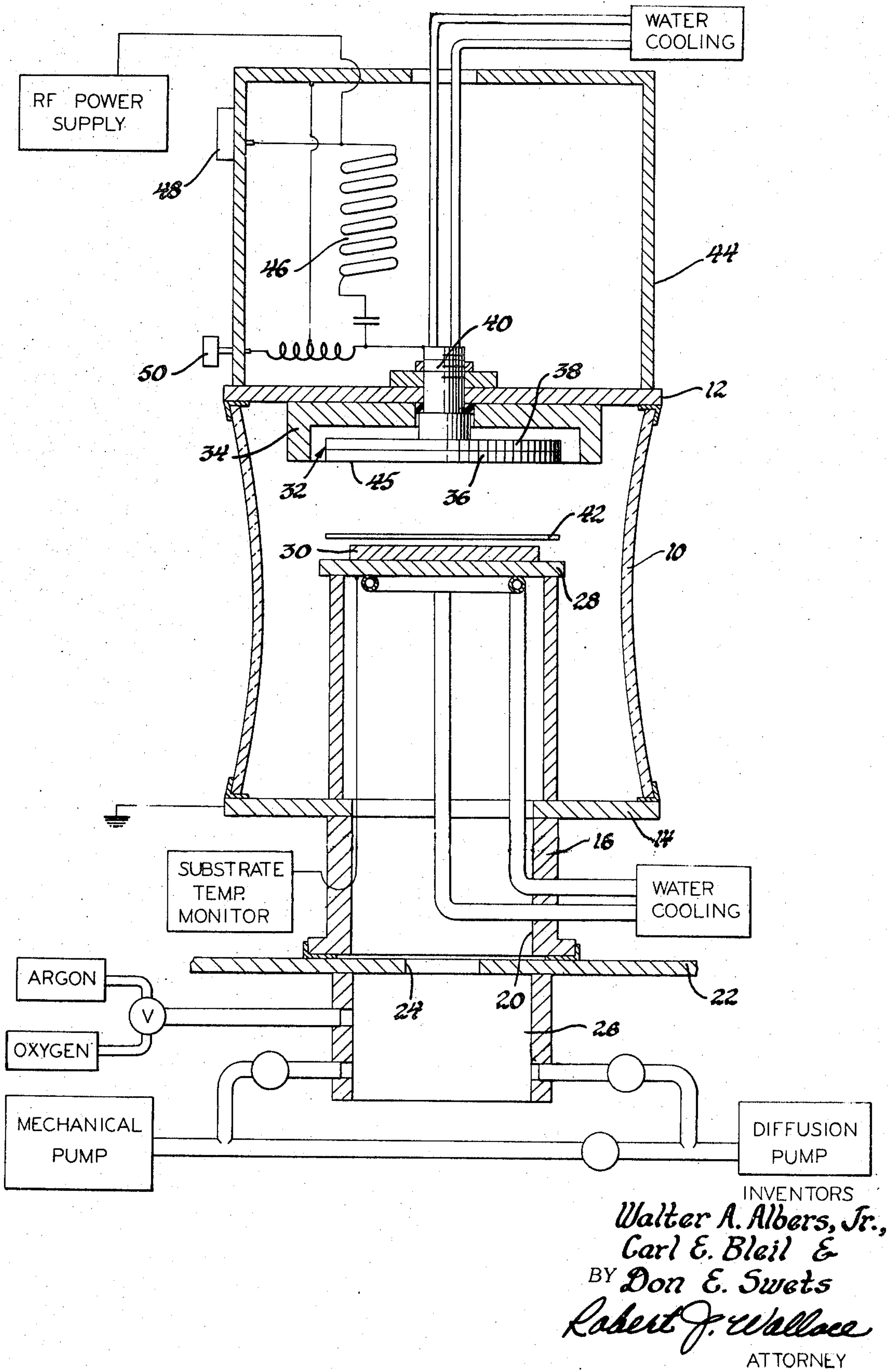
INVENTORS
Walter A. Albers, Jr.,
Carl E. Bleil &
Don E. Swets
BY Robert J. Wallace
ATTORNEY United States Patent Office 3,730,867

Patented May 1, 1973

3,730,867

RF SPUTTERING OF TETRAGONAL GERMANIUM DIOXIDE

Walter A. Albers, Jr., Northville, Carl E. Bleil, Birmingham, and Don E. Swets, Sterling Heights, Mich., assignors to General Motors Corporation, Detroit, Mich.

Filed Oct. 26, 1970, Ser. No. 83,779

Int. Cl. C23c 5/00

U.S. Cl. 204—192 4 Claims

ABSTRACT OF THE DISCLOSURE

Films of the non-naturally occurring, tetragonal, crystalline form of germanium dioxide are directly deposited on any substrate in a controlled radio frequency sputtering process. The film is sputtered from a cooled tetragonal germanium dioxide target onto a cooled substrate at a low rate in a non-reducing atmosphere.

BACKGROUND OF THE INVENTION

This invention relates to radio frequency sputtering and more particularly to a radio frequency sputtering technique for producing the tetragonal form of germanium dioxide. It is especially useful for producing masking and passivating films in the manufacture of semiconductor devices, particularly germanium devices.

The existence and the potential utility of the tetragonal crystalline form of germanium dioxide has long been recognized, even though it is not a naturally occurring material. Anomalously, the tetragonal form of germanium dioxide is actually the thermodynamically stable form of germanium dioxide at normal temperatures and pressures. Nonetheless, oxidation of germanium under ordinary conditions invariably produces either an amorphous oxide or the hexagonal crystalline oxide. These other oxide forms are soluble in water, while tetragonal germanium dioxide is insoluble in water. Moreover, the tetragonal oxide form is dense, substantially chemically inert, and similar to germanium in expansion characteristics.

Hence, it can be appreciated that films of tetragonal germanium dioxide could be as useful in germanium semiconductor devices, as silicon dioxide films are in silicon semiconductor devices. However, no technique was known for conveniently producing them. Previously, tetragonal germanium dioxide could only be produced by first forming the hexagonal crystalline oxide and then converting it into the tetragonal oxide at temperatures of about 750° C. to 1000° C. The most satisfactory publicly known technique at this time involves two separate operations and significant yield losses. Moreover, it subjects a semiconductive element to unduly high temperatures, which can deleteriously affect electronic properties of the elements being processed. Hence, this technique has not provided a commercially satisfactory means for producing tetragonal dioxide films on germanium.

Lower temperature conversion techniques are known but do not provide complete conversion. Moreover, the best known of these, a hydrothermal conversion, requires extremely high pressures, making it impractical for high volume commercial production.

The recently filed United States patent application Ser. No. 28,773, filed Apr. 15, 1970, in the name of Walter A. Albers, Jr. and assigned to the assignee of the present invention, describes a novel technique for directly growing thin films of tetragonal germanium dioxide by controlled oxidation of a germanium surface. We have now found that such thin films can be directly deposited, not just grown, and on virtually any substrate but best on germanium.

SUMMARY OF THE INVENTION

It is an object of this invention to provide a process for directly depositing tetragonal germanium dioxide films on various substrates, particularly germanium.

A further object of the invention is to provide an improved process for producing masking and passivating films on surfaces of semiconductors such as germanium for use in the manufacture of semiconductor devices.

These and other objects of the invention are achieved by radio frequency sputtering tetragonal germanium dioxide from a target onto a substrate on an anode support in a nonreducing atmosphere at a low rate while maintaining both the target and substrate temperature below the tetragonal-hexagonal germanium dioxide conversion temperature.

BRIEF DESCRIPTION OF THE DRAWING

Other objects, features and advantages of the invention will become more apparent from the following description of preferred embodiments thereof and from the drawing which schematically shows a sectional view of a typical radio frequency sputtering apparatus such as can be used to practice this invention.

DESCRIPTION OF THE PREFERRED EMBODIMENTS

We have recognized that in radio frequency sputtering processes the crystalline nature of the coating produced is critically dependent upon the crystalline nature of the target material. Consequently, the target material in this process must be substantially pure tetragonal germanium dioxide. Moreover, it must be cooled during the deposition process to prevent inversion to the heaxagonal crystalline form. The substrate being coated may also be cooled during the deposition process to avoid thermally generated property changes after deposition. Also deposition rate, or total power, must be maintained low to avoid localized overheating and insure good growth of tetragonal crystals.

The target surface may be polycrystalline or monocrystalline. Moreover, it should be coherent enough to merely erode and not disintegrate during the sputtering process.

Substantially pure tetragonal germanium dioxide can be produced for use as a target material by any of the known and accepted techniques for bulk conversion of hexagonal germanium dioxide powder. These techniques include conversion in a hydrothermal bomb or in air at normal pressure when mixed with 1% lithium carbonate. We have obtained highly successful results using the lithium carbonate bulk conversion technique.

In the latter technique, commercial hexagonal germanium dioxide powder is ball milled in acetone to an average particle size of about 1 micron. 1% by weight lithium carbonate is then added and mixed. The acetone is then evaporated and the mixture heated to 900° C. for 22 hours to produce a bulk conversion from hexagonal to tetragonal crystalline form. After cooling to room temperature, and converted powder is washed with concentrated hydrofluoric acid to dissolve any residual hexagonal germanium dioxide. The converted powder is then rinsed with water and dried.

The converted powder is then lightly coated with an organic binder and pressed into a target briquette. The coating can be applied by mixing the dry powder with 6% by weight of a phenolic casting resin, such as Araldite, and sufficient solvent, such as acetone, to make a slurry. The slurry is stirred, shaken through a 40 mesh screen and dried. The resulting material is pressed into a 4 inch diameter disk at 80 tons pressure and room temperature to produce a ⅛ inch thick target briquette. The target briquette is heated at 180° F. for 24 hours in air atmosphere to cure the resin. The resulting disk is cemented to a water cooled copper support with silver paste, for mounting in a radio frequency sputtering chamber. The presence of the small amount of organic resin binder does not seem to interfere with the deposition process.

An alternate form of preparation involves the simultaneous conversion of hexagonal powder and sintering of the particles together to form a target briquette. Hence, the casting resin is not needed. In this latter technique the hexagonal germanium oxide powder is ball milled in acetone to about 1 micron particle size, mixed with 1% by weight lithium carbonate. The resultant mix is then heated to 500° C. for approximately 3 hours to drive off the carbon dioxide from the lithium carbonate. The mix is then ball milled again in acetone and dried. It is pressed at about 80 tons pressure to form a 4 inch briquette ⅛ inch in thickness. After pressing the briquette is heated in air to a temperature of 1025° C. for about 12 hours. This last heating not only converts the powder from hexagonal crystalline form to the tetragonal crystalline form but also sinters the particles together.

It is then carefully washed with concentrated hydrofluoric acid to remove any residual hexagonal powder, rinsed with water, and dried. It can be somewhat difficult to completely remove residual hexagonal powder from a sintered briquette. Also, if conversion was not complete, significant voids can be left in the briquette. Consequently, while converting a briquette is an effective technique for producing a target face, it is not preferred. In any event, the thus treated briquette can then be attached to a water cooled copper support with silver paste and mounted in a radio frequency sputtering chamber.

An important consideration in the invention is that tetragonal germanium dioxide is stable only at lower temperatures and pressures. During the deposition process the target must be maintained below the critical tetragonal-hexagonal inversion temperature of about 1060° C. A critical temperature for the substrate is established by the thermal properties of the substrate material. In any event, it should be below about 1060° C. Accordingly, both the support for the target and the substrate must have a sufficient water cooling capacity to insure that the target and substrate will remain below their respective critical temperatures during the deposition process.

An apparatus suitable for practicing the process of this invention is shown in the drawing. It is in general a typical radio frequency sputtering apparatus, and includes a work chamber formed by a generally cylindrical Pyrex enclosure 10 having a top end 12 and a bottom end 14. Bottom end 14 has a depending skirt portion 16 circumscribing an aperture therein forming a passageway 20. Skirt portion 16 in turn rests on base plate 22 over an aperture 24 therein which communicates with vacuum manifold 26. A mechanical pump and a diffusion pump are appropriately connected to vacuum manifold 26 so that the work chamber can be evacuated and purged as desired. A source of argon and oxygen is also connected to vacuum manifold 26 to provide any selected low pressure atmosphere desired for the work chamber.

A conductive work support table 28 having a substrate 30 thereon rests on bottom end 14 of the work chamber. Suspended from the top end 12 of the work chamber is a target 32 and a back shield 34. The target includes a working face 36 of briquetted tetragonal germanium dioxide silver pasted to a supporting metal plate 38 that has an attached metal stud portion 40. Both the back plate 38 and the stud portion 40 are water cooled and preferably made of copper. Analogously, work suport table 28 is preferably of copper and is also water cooled, to keep the substrate relatively cool during sputtering. A shutter 42 is disposed between substrate 30 and target 32.

An upper housing 44 rests on top end base 12 enclosing a coupling network 46, a tuning meter 48 and tuning adjustment knob 50, which are appropriately interconnected with target 32 and a radio frequency powder supply. The bottom end 14 of the work chamber is electrically grounded to complete the working circuit for the apparatus Tetragonal germanium dioxide can be sputtered in the apparatus shown onto a germanium substrate in the following manner. A single crystal germanium slice is lapped and polished to any desired degree of perfection. It is preferably etched in CP–4 for a few seconds, rinsed successively in water and ethyl alcohol and then dried. The germanium slice is then placed on work table 28 in the work chamber so that its major surface is substantially parallel the face 45 of the target portion 36. In this particular instance, a target-substrate spacing of about 3 centimeters can be used.

The system is then sealed and evacuated to $10^{-5}$ torr. It is maintained at this low pressure for about 2 hours to outgas the system and the chamber backfilled with an equal mixture of argon and oxygen to a pressure of $20 \times 10^{-4}$ torr. Sputtering must be accomplished in a non-reducing atmosphere and preferably in an oxidizing atmosphere to maintain the desired chemistry in the film being deposited. We have found that an equal mixture of argon and oxygen is satisfactory for this purpose, although sputtering can be satisfactorily accomplished in air.

An alternative substrate surface preparation prior to sputtering involves exchanging the role of substrate and target, so that a small amount of substrate material is sputtered. Thus, a clean substrate surface can be prepared in the vacuum chamber itself. Otherwise, the sputtering procedure is identical as described to this point. With the shutter in place between the target and the substrate, radio frequency power is turned on and tuned to a discharge of about 5:1 forward to reflected power. It is adjusted to a stable radio frequency current of 20 milliamperes, which corresponds to 80 watts of RF power. We have found that radio frequency power should be maintained low during deposition and preferably below 200 watts. When the discharge is initiated, the water cooling is also started. As previously indicated, both the target and the substrate should be maintained below about 1060° C. throughout the entire process. The discharge is continued with the shutter 42 in place for 15 minutes to presputter and clean-up the target as well as stabilize the system.

The argon-oxygen flow is next adjusted to maintain a $20 \times 10^{-4}$ torr pressure. The shutter can then be opened to commence sputtering of the target material onto the germanium substrate. Sputtering is then continued with the shutter open for approximately 1½ hours to obtain a tetragonal germanium dioxide film thickness on the substrate of about 5000 angstroms. At this point the sputtering can be discontinued by simply turning off the radio frequency power and continuing to cool the substrate for 15 minutes. After this, the system is backfilled with argon to normal pressure, and the work chamber can be opened to remove the coated substrate.

We claim:

1. A radio frequency sputtering process for depositing thin films of tetragonal germanium dioxide onto a substrate which comprises placing a substrate adjacent an anode in a radio frequency sputtering chamber, providing in said chamber a cathode having a target face consisting essentially of tetragonal germanium dioxide, producing a low pressure oxidizing atmosphere in said chamber, applying a radio frequency field between said cathode and said anode to produce a radio frequency discharge therebetween and sputter material from said target face onto said substrate, cooling the target and the substrate during said discharge below temperatures of about 1060° C., adjusting said discharge commensurate with said cooling to achieve an RF discharge below about 16 watts per square inch of target area and to prevent inversion of said tetragonal germanium dioxide to hexagonal form, and continuing to sputter and cool for a sufficient duration to produce a tetragonal germanium dioxide film of predetermined thickness on said substrate.

2. The process as defined in claim 1 wherein the target surface is a briquette of tetragonal germanium dioxide produced by conversion of powdered hexagonal germanium dioxide containing about 1% by weight lithium carbonate.

3. A radio frequency sputtering process for depositing thin films of tetragonal germanium dioxide onto a substrate which comprises placing a substrate adjacent an anode in a radio frequency sputtering chamber, providing in said chamber a cathode having a target face consisting essentially of tetragonal germanium dioxide, producing a low pressure oxidizing atmosphere in said chamber below about $20\times10^{-4}$ torr, applying a radio frequency field between said cathode and said anode to produce a radio frequency discharge therebetween and sputter material from said target face onto said substrate, cooling the target and the substrate during said discharge below temperatures of about 1060° C., adjusting said discharge commensurate with said cooling to achieve a radio frequency discharge below about 16 watts per square inch of target area and prevent inversion of said tetragonal germanium dioxide to hexagonal form, and continuing to sputter and cool for a sufficient duration to produce a tetragonal germanium dioxide film of predetermined thickness on said substrate while maintaining total power for said discharge below about 200 watts.

4. A radio frequency sputtering process for depositing thin films of tetragonal germanium dioxide onto a substrate which comprises placing a substrate adjacent an anode in a radio frequency sputtering chamber, providing in said chamber a cathode having a target face consisting essentially of tetragonal germanium dioxide, said target face having a briquette of tetragonal germanium dioxide produced by conversion of powdered hexagonal germanium dioxide containing about 1% by weight lithium carbonate, producing a low pressure substantially equal mixture of oxygen and inert gas in said chamber, applying a radio frequency field between said cathode and said anode to produce a radio frequency discharge therebetween and sputter material from said target face onto said substrate, cooling the target and the substrate during said discharge below temperatures of about 1060° C., adjusting said discharge commensurate with said cooling to achieve a radio frequency discharge of below about 6 watts per square inch of target area and prevent inversion of said tetragonal germanium dioxide to hexagonal form, and continuing to sputter and cool for a sufficient duration to produce a tetragonal germanium dioxide film of predetermined thickness on said substrate while maintaining total power for said discharge below about 200 watts.

References Cited

UNITED STATES PATENTS

| | | | |
|---|---|---|---|
| 3,432,417 | 3/1969 | Davidse et al. | 204—192 |
| 3,481,854 | 12/1969 | Lane | 204—192 |
| 3,483,110 | 12/1969 | Rozgonyi | 204—192 |
| 3,294,660 | 12/1966 | Kingery et al. | 204—192 |
| 3,558,461 | 1/1971 | Parsi | 204—192 |
| 3,021,271 | 2/1962 | Wehner | 204—192 |
| 3,420,763 | 1/1969 | Polito et al. | 204—192 |

HOWARD S. WILLIAMS, Primary Examiner

S. S. KANTER, Assistant Examiner